United States Patent
Ochi et al.

(10) Patent No.: US 8,579,747 B2
(45) Date of Patent: Nov. 12, 2013

(54) POWER TRANSMISSION BELT METHOD FOR PRODUCTION THEREOF

(75) Inventors: Akira Ochi, Anjo (JP); Youichi Murata, Kariya (JP); Katsumori Fujii, Anjo (JP); Masashi Hattori, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 264 days.

(21) Appl. No.: 12/929,368

(22) Filed: Jan. 19, 2011

(65) Prior Publication Data

US 2011/0251006 A1  Oct. 13, 2011

(30) Foreign Application Priority Data

Jan. 27, 2010 (JP) ................................. 2010-015781
Dec. 29, 2010 (WO) .................. PCT/JP2010/073823

(51) Int. Cl.
*F16G 1/26* (2006.01)
*B32B 37/14* (2006.01)

(52) U.S. Cl.
USPC ............. 474/264; 156/137; 156/60; 474/237; 29/525

(58) Field of Classification Search
USPC ................... 474/264, 261, 237, 242; 156/137
See application file for complete search history.

(56) References Cited

U.S. PATENT DOCUMENTS

| | | | | |
|---|---|---|---|---|
| 2,562,166 A | * | 7/1951 | Bendall | 474/153 |
| 3,544,403 A | * | 12/1970 | Zenere | 156/137 |
| 3,889,545 A | * | 6/1975 | Baublys et al. | 474/205 |
| 4,530,684 A | * | 7/1985 | Miranti, Jr. | 474/264 |
| 4,579,549 A | | 4/1986 | Okawa et al. | |
| 4,884,998 A | * | 12/1989 | Miranti, Jr. | 474/205 |
| 5,221,458 A | * | 6/1993 | Herbert et al. | 119/215 |
| 5,518,460 A | * | 5/1996 | White et al. | 474/139 |
| 6,090,004 A | * | 7/2000 | Kanehara et al. | 474/242 |
| 6,432,012 B1 | * | 8/2002 | Kanehara et al. | 474/242 |
| 6,651,299 B2 | * | 11/2003 | Mitsubayashi et al. | 29/90.7 |
| 6,875,143 B2 | * | 4/2005 | Brandsma | 474/242 |
| 6,916,393 B2 | * | 7/2005 | Ohzuru et al. | 156/137 |
| 7,354,365 B2 | | 4/2008 | Kanehara et al. | |

FOREIGN PATENT DOCUMENTS

| | | |
|---|---|---|
| JP | A-59-019745 | 2/1984 |
| JP | A-63-096258 | 4/1988 |
| JP | A-10-169719 | 6/1998 |
| JP | A-11-303943 | 11/1999 |

(Continued)

OTHER PUBLICATIONS

Mar. 15, 2011 International Search Report issued in PCT/JP2010/073823 (with translation).

(Continued)

*Primary Examiner* — William E Dondero
*Assistant Examiner* — Michael Riegelman
(74) *Attorney, Agent, or Firm* — Oliff & Berridge, PLC (57) ABSTRACT

A stacked ring 2 that forms a transmission belt is formed by stacking a plurality of elastically deformable ring materials $20_1$ to $20_6$ together. Shot peening is performed on surfaces of the ring materials $20_1$ to $20_3$ of the first layer as the innermost layer to the third layer so that a residual compressive stress in the ring materials $20_1$ to $20_3$ is higher than that in the ring materials $20_4$ to $20_6$ of the fourth to sixth layers. The outer circumferential length of the ring material $20_3$ of the third layer is longer than the inner circumferential length of the ring material $20_4$ of the fourth layer, and the ring material $20_3$ of the third layer is press-fit into the ring material $20_4$ of the fourth layer.

8 Claims, 6 Drawing Sheets

(56) References Cited

FOREIGN PATENT DOCUMENTS

| | | |
|---|---|---|
| JP | A-2005-256870 | 9/2005 |
| JP | A-2006-220273 | 8/2006 |
| JP | A-2006-266363 | 10/2006 |
| JP | A-2007-298125 | 11/2007 |

OTHER PUBLICATIONS

Mar. 26, 2013 Notification of Reason(s) for Refusal issued in Japanese Patent Application No. 2011-551718 (partial translation).

* cited by examiner

POWER TRANSMISSION BELT METHOD FOR PRODUCTION THEREOF

INCORPORATION BY REFERENCE

The disclosure of Japanese Patent Application No. 2010-015781 filed on Jan. 27, 2010 including the specification, drawings and abstract and the disclosure of PCT Patent Application No. PCT/JP2010/073823 filed on Dec. 29, 2010 including the specification, drawings and abstract are incorporated herein by reference in its entirety.

BACKGROUND OF THE INVENTION

The present invention relates to a transmission belt and a manufacturing method thereof, and more particularly to a transmission belt that is applied to a belt-type continuously variable transmission, and a manufacturing method thereof.

DESCRIPTION OF THE RELATED ART

In related art, continuously variable transmissions are known which have a cage pulley that is structured by arranging a plurality of belt drive elements on a circumference having its center on a central axis or an assumed central axis so that the belt drive elements extend substantially parallel to the central axis or the assumed central axis, and a transmission belt that is wound around the cage pulley (see, e.g., Japanese Patent Application Publication No. JP-A-2007-298125). In such continuously variable transmissions, an effective radius of the cage pulley is changed by changing the distance between the plurality of belt drive elements and the central axis or the assumed central axis, whereby a desired speed ratio is obtained. The transmission belt of such continuously variable transmissions includes a ring (a stacked ring) formed by stacking together a plurality of endless sheet metals (ring materials), and a plurality of belt elements attached to the ring at right angles to a circumferential direction of the ring. The circumferences of the plurality of endless sheet metals are increased in sequence so that no gap is produced between the layers when stacked together.

Further, in related art, V-belts for continuously variable transmissions are also known which are formed by a stacked ring formed in a layered form by fitting a plurality of endless rings on each other, and a plurality of V-shaped elements linked together and arranged in a circumferential direction of the stacked ring so as to be able to contact each other, and fitting clearance between adjacent ones of the rings of the stacked ring is set to negative clearance (see, e.g., Japanese Patent Application Publication No. JP-A-H10-169719). In such V-belts, the outer circumferential length of the inner ring is equal to or longer than the inner circumferential length of the outer ring, as measured before fitting adjacent ones of the rings of the stacked ring on each other. Thus, the fitting clearance between the adjacent ones of the rings of the stacked ring is set so that the substantially the same stress is generated in each of the innermost to outermost rings of the stacked ring when the belt is used.

SUMMARY OF THE INVENTION

In the transmission belts including the stacked ring formed by stacking the plurality of ring materials, a stress that is generated in each ring material tends to increase from the outermost ring toward the innermost ring of the stacked ring when the transmission belt is used. In particular, a significantly high stress is generated in the ring material of the innermost layer. As a solution to this, as in the transmission belt included in continuously variable transmissions as described in Japanese Patent Application Publication No. JP-A-2007-298125, a tensile stress, which is generated in each of the plurality of endless sheet metals when tension (a tensile force) is applied to the transmission belt, can be theoretically made to be approximately the same by eliminating the clearance between the endless sheet metals. However, even in the transmission belts having such a structure, the endless sheet metals of the inner layers (especially the innermost layer) tend to degrade after a long period of use. Moreover, as in the V-belt for continuously variable transmissions as described in Japanese Patent Application Publication No. JP-A-H10-169719, the stress that is generated in each ring material can be made to be substantially the same at relatively low cost by setting the fitting clearance between adjacent ones of the rings of the stacked ring to negative clearance. However, increasing the fitting clearance to the negative side can reduce adhesion between adjacent ones of the rings as the ring materials are bent, as shown in FIG. 1 of Japanese Patent Application Publication No. JP-A-H10-169719, which can make assembling of the elements to the stacked ring troublesome. One possible method to reduce the stress that is generated in the stacked ring when the transmission belt is used is to apply a residual compressive stress to the stacked ring. However, the process of applying the residual compressive stress to the ring materials typically increases the cost, as compared to the process of making the outer circumferential length of the inner ring equal to or longer than the inner circumferential length of the outer ring as measured before fitting adjacent ones of the rings on each other.

Thus, it is a primary object of the present invention to reduce a stress that is generated in ring materials when a transmission belt is used, while satisfactorily maintaining assembling capability of elements to a stacked ring and suppressing an increase in cost, in the transmission belt including the stacked ring formed by stacking the plurality of elastically deformable ring materials together.

A transmission belt and a manufacturing method thereof according to the present invention take the following measures in order to achieve the above primary object.

A transmission belt according to a first aspect of the present invention includes a stacked ring formed by stacking a plurality of elastically deformable ring materials together, and a plurality of elements arranged in a ring shape and linked together by the stacked ring. In the transmission belt, when "n" represents the number of ring materials that are stacked together, surfaces of the ring materials of a first layer as an innermost layer to a predetermined $m^{th}$ layer (where "m" is any one of integers ranging from a value 1 to a value n−1) are subjected to a surface treatment for applying a residual compressive stress so that the residual compressive stress in the ring materials of the first layer to the predetermined $m^{th}$ layer is higher than that in the ring material of an $(m+1)^{th}$ layer, and each of the ring materials of the first layer to the $m^{th}$ layer is formed so as to have an outer circumferential length longer than an inner circumferential length of the ring material that is located on an outer layer side and has an inner peripheral surface in contact with an outer peripheral surface of the each of the ring materials.

The stacked ring of this transmission belt is formed by stacking the n elastically deformable ring materials together. In this stacked ring, the surfaces of the ring materials of the first layer as the innermost layer to the predetermined $m^{th}$ layer are subjected to the surface treatment for applying the residual compressive stress so that the residual compressive stress in the ring materials of the first to $m^{th}$ layers is higher than that in the ring material of the $(m+1)^{th}$ layer. Thus, each of the ring materials of the first to the $m^{th}$ layers has higher strength (yield strength) than at least the ring material of the $(m+1)^{th}$ layer. Moreover, each of the ring materials of the first to $m^{th}$ layers is formed so as to have the outer circumferential length longer than the inner circumferential length of the ring material on the outer layer side having the inner peripheral surface in contact with the outer peripheral surface of the each of the ring materials. Thus, when forming this stacked ring, each of the ring materials of the first to $m^{th}$ layers is press-fit into the ring material located on the outer layer side thereof (that is, located immediately outside thereof). Accordingly, when this transmission belt is assembled, a compressive stress is further applied to the ring materials of the first to $m^{th}$ layers, whereby the strength of the ring materials of the first to $m^{th}$ layers can further be increased. Moreover, the surfaces of the ring materials of the first to $m^{th}$ layers are subjected to the surface treatment for applying the residual compressive stress so that the residual compressive stress in the ring materials of the first to $m^{th}$ layers is higher than that in the ring material of the $(m+1)^{th}$ layer. This can suppress an increase in cost associated with the surface treatment, as compared to the case where the surface treatment for applying the residual compressive stress is performed on the ring materials of all the layers. Moreover, performing the surface treatment on the surfaces of the ring materials of the first to $m^{th}$ layers can suppress an increase in compressive stress that should be applied to the ring materials of the first to $m^{th}$ layers by press-fitting each of the ring materials of the first to $m^{th}$ layers into the ring material on the outer layer side thereof, namely an increase in difference between the outer circumferential length of each of the ring materials on the inner layer side (the first to $m^{th}$ layers) and the inner circumferential length of the ring material on the outer layer side thereof (the second to $(m+1)^{th}$ layers). Thus, adhesion can be satisfactorily ensured between adjacent ones of the ring materials located on the inner side of the $(m+1)^{th}$ layer. As a result, in this transmission belt, an increase in cost is suppressed by reducing the number of ring materials to be subjected to the shot peening, and assembling capability of the elements to the stacked ring is satisfactorily maintained by satisfactorily ensuring adhesion between the ring materials. At the same time, the stress that is generated in the ring materials when the transmission belt is used can be reduced.

According to a second aspect, each of the ring materials of the first to $m^{th}$ layers may be in contact with the inner peripheral surface of the ring material on the outer layer side along an entire circumference. Thus, the assembling capability of the elements to the stacked ring can be satisfactorily maintained.

Moreover, according to a third aspect, when the ring material of a $k^{th}$ layer and the ring material of a $(k+1)^{th}$ layer have a perfect circle shape (where "k" is an integer ranging from the value 1 to the value "m"), an outer diameter of the ring material of the $k^{th}$ layer may be larger than an inner diameter of the ring material of the $(k+1)^{th}$ layer. Thus, the outer circumferential length of the ring material of the $k^{th}$ layer can be made longer than the inner circumferential length of the ring material of the $(k+1)^{th}$ layer.

According to a fourth aspect, a difference between the outer diameter of the ring material of the $k^{th}$ layer and the inner diameter of the ring material of the $(k+1)^{th}$ layer may be determined so that a maximum value of a tensile stress that is generated in the plurality of ring materials during power transmission of the transmission belt under a predetermined condition does not exceed a predetermined maximum allowable tensile stress. Thus, the strength of the ring materials of the first to $m^{th}$ layers can be more properly increased. In this case, the difference between the outer diameter of the ring material of the $k^{th}$ layer and the inner diameter of the ring material of the $(k+1)^{th}$ layer is preferably determined so as to be within such a range that is larger than a value produced in a so-called tolerance range (an allowable range with respect to a reference value), and that the ring material of the $k^{th}$ layer can be press-fit into the ring material of the $(k+1)^{th}$ layer so that a contact state between the inner peripheral surface of the ring material of the $(k+1)^{th}$ layer and the outer peripheral surface of the ring material of the $k^{th}$ layer is satisfactorily maintained when tension is applied to the stacked ring.

Moreover, according to a fifth aspect, when an overlap interference is a value that is obtained by subtracting the outer diameter of the ring material of the $k^{th}$ layer from the inner diameter of the ring material of the $(k+1)^{th}$ layer, an absolute value of the overlap interference between the ring material of the innermost layer and the ring material of a second innermost layer may be determined so as to be largest among all of absolute values of the overlap interferences in the stacked ring.

According to a sixth aspect, when the overlap interference is a value that is obtained by subtracting the outer diameter of the ring material of the $k^{th}$ layer from the inner diameter of the ring material of the $(k+1)^{th}$ layer, the value "m" may be determined based on a limit value of an amount by which the tensile stress that is generated in the ring material of the $k^{th}$ layer is decreased by setting the overlap interference to a negative value. Thus, the number of layers of the ring materials to be subjected to the surface treatment can be properly determined.

Moreover, according to a seventh aspect, when "n" is an integer of a value 3 or more, and "m" is any one of integers ranging from the value 1 to a value "n–2," an outer circumferential length of the ring material of the $(m+1)^{th}$ layer may be longer than the inner circumferential length of the ring material of an $(m+2)^{th}$ layer. Thus, the compressive stress can further be applied to the ring material of the $(m+1)^{th}$ layer when the transmission belt is assembled. In this manner, relatively low-cost processing is performed in which the outer circumferential length of each of those ring materials which are located on the outer layer side (the $m^{th}$ and $(m+1)^{th}$ layers) where the stress generated in the ring materials when the transmission belt is used is relatively low is made longer than the inner circumferential length of the ring material located immediately outside thereof. Moreover, the shot peening is performed on those ring materials which are located on the inner layer side (the first to $m^{th}$ layers) where the stress generated in the ring materials when the transmission belt is used is relatively high. Thus, an increase in cost is suppressed by reducing the number of ring materials to be subjected to the shot peening, and the assembling capability of the elements to the stacked ring is satisfactorily maintained by satisfactorily ensuring adhesion between the ring materials. At the same time, the stress that is generated in the ring materials when the transmission belt is used can be satisfactorily reduced.

A method for manufacturing a transmission belt according to an eighth aspect of the present invention is a method for manufacturing a transmission belt including a stacked ring formed by stacking a plurality of elastically deformable ring materials together, and a plurality of elements arranged in a ring shape and linked together by the stacked ring. The method includes: forming, when "n" represents the number of ring materials that are stacked together, each of the ring materials of a first layer as an innermost layer to a predetermined $m^{th}$ layer (where "m" is any one of integers ranging from a value 1 to a value n–1) so that the each of the ring materials has an outer circumferential length longer than an inner circumferential length of the ring material that is located on an outer layer side and has an inner peripheral surface in contact with an outer peripheral surface of the each of the ring materials; and subjecting surfaces of the ring materials of the first layer to the $m^{th}$ layer to a surface treatment for applying a residual compressive stress so that the residual compressive stress in the ring materials of the first layer to the $m^{th}$ layer is higher than that in the ring material of an $(m+1)^{th}$ layer.

When forming the stacked ring by this method, each of the ring materials of the first to $m^{th}$ layers is press-fit into the ring material located on the outer circumference side thereof (that is, located immediately outside thereof). Thus, a compressive stress is further applied to the ring materials of the first to $m^{th}$ layers, whereby the strength of the ring materials of the first to $m^{th}$ layers can further be increased. The surfaces of the ring materials of the first to $m^{th}$ layers are subjected to the surface treatment for applying the residual compressive stress so that the residual compressive stress in the ring materials of the first to $m^{th}$ layers is higher than that in the ring material of the $(m+1)^{th}$ layer. This can suppress an increase in cost associated with the surface treatment, as compared to the case where the surface treatment for applying the residual compressive stress is performed on the ring materials of all the layers. Moreover, performing the surface treatment on the surfaces of the ring materials of the first to $m^{th}$ layers can suppress an increase in compressive stress that should be applied to the ring materials of the first to $m^{th}$ layers by press-fitting each of the ring materials of the first to $m^{th}$ layers into the ring material on the outer layer side thereof, namely an increase in difference between the outer circumferential length of each of the ring materials on the inner layer side (the first to $m^{th}$ layers) and the inner circumferential length of the ring material on the outer layer side thereof (the second to $(m+1)^{th}$ layers). Thus, adhesion can be satisfactorily ensured between adjacent ones of the ring materials located on the inner side of the $(m+1)^{th}$ layer. As a result, according to this method, an increase in cost is suppressed by reducing the number of ring materials to be subjected to the shot peening, and assembling capability of the elements to the stacked ring is satisfactorily maintained by satisfactorily ensuring adhesion between the ring materials. At the same time, the stress that is generated in the ring materials when the transmission belt is used can be reduced.

DETAILED DESCRIPTION OF THE EMBODIMENT

An embodiment of the present invention will be described below with reference to the accompanying drawings.

Figure 1:
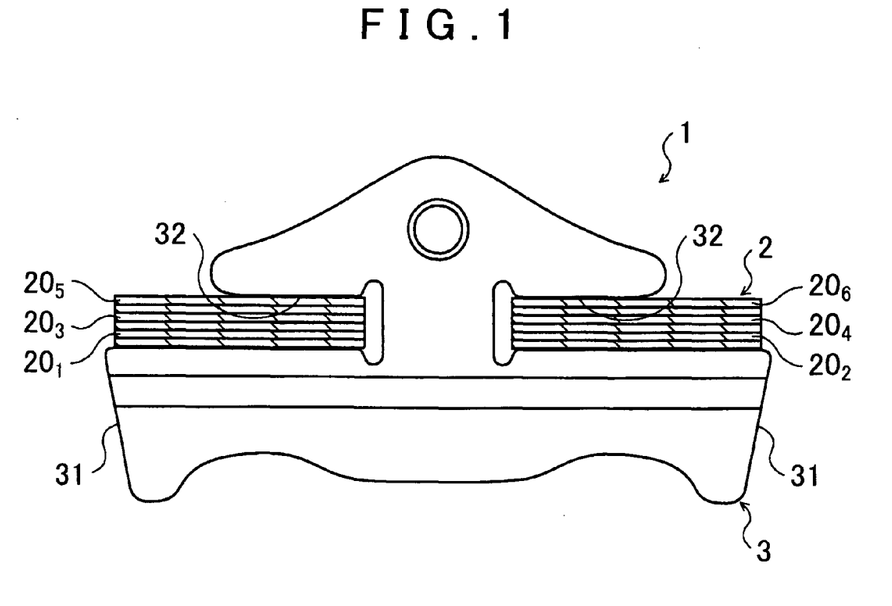
FIG. 1 is a partial cross-sectional view showing an example of a transmission belt 1 of the present invention.

FIG. 1 is a partial cross-sectional view showing an example of a transmission belt 1 of the present invention. The transmission belt 1 shown in the drawing forms a continuously variable transmission (CVT), together with a primary pulley provided on a primary shaft as a drive-side rotating shaft, and a secondary pulley provided on a secondary shaft as a driven-side rotating shaft placed parallel to the primary shaft and a secondary pulley (none of these elements are shown). The transmission belt 1 is wrapped around a groove (a V-groove) of the primary pulley formed by a movable sheave and a fixed sheave, and a groove (a V-groove) of the secondary pulley similarly formed by a movable sheave and a fixed sheave, and transmits power applied to the primary shaft to the secondary shaft. At this time, by changing the groove width of at least one of the primary pulley and the secondary pulley, the power applied to the primary pulley can be transmitted to the secondary shaft while continuously varying its speed.

Figure 2:
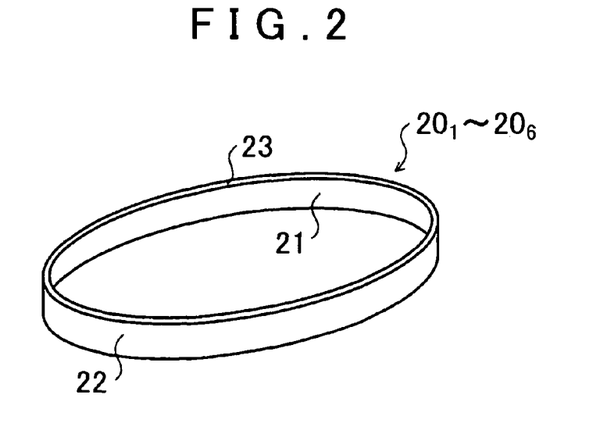
FIG. 2 is a perspective view showing, by way of example, ring materials $20_1$ to $20_6$ that form a stacked ring 2 of the transmission belt 1.

As shown in FIG. 1, the transmission belt 1 includes: two stacked rings 2 each formed by stacking together a plurality of (six in the present embodiment) elastically deformable ring materials $20_1$ to $20_6$ (see FIG. 2); and a plurality of (e.g., several hundreds of) elements 3 arranged in a ring shape and linked together by the stacked rings 2. The ring materials $20_1$ to $20_6$ forming the stacked rings 2 are elastically deformable materials that are cut out from a steel sheet drum, and are processed so as to have approximately the same thickness (e.g., about 180 to 190 μm), and to have predetermined circumferences that are predetermined for the respective ring materials (e.g., about 570 to 600 mm). Each element 3 is cut out from the a steel sheet, and has a pair of side faces 31 formed so as to be tilted toward each other from the outer side to the inner side (from the upper side to the lower side in the drawing), and a pair of right and left recesses 32 extending in a lateral direction and being open outward. The stacked rings 2 are fitted in the recesses 32 of the elements 3 so as to nip the plurality of elements 3 from both sides. Thus, the plurality of elements 3 are linked together by the two stacked rings 2 in the state where the elements 3 are arranged in the ring shape. Note that it should be understood that in the present invention, the number of ring materials that form each stacked ring 2 is not limited to the above mentioned value (six).

Figure 3:
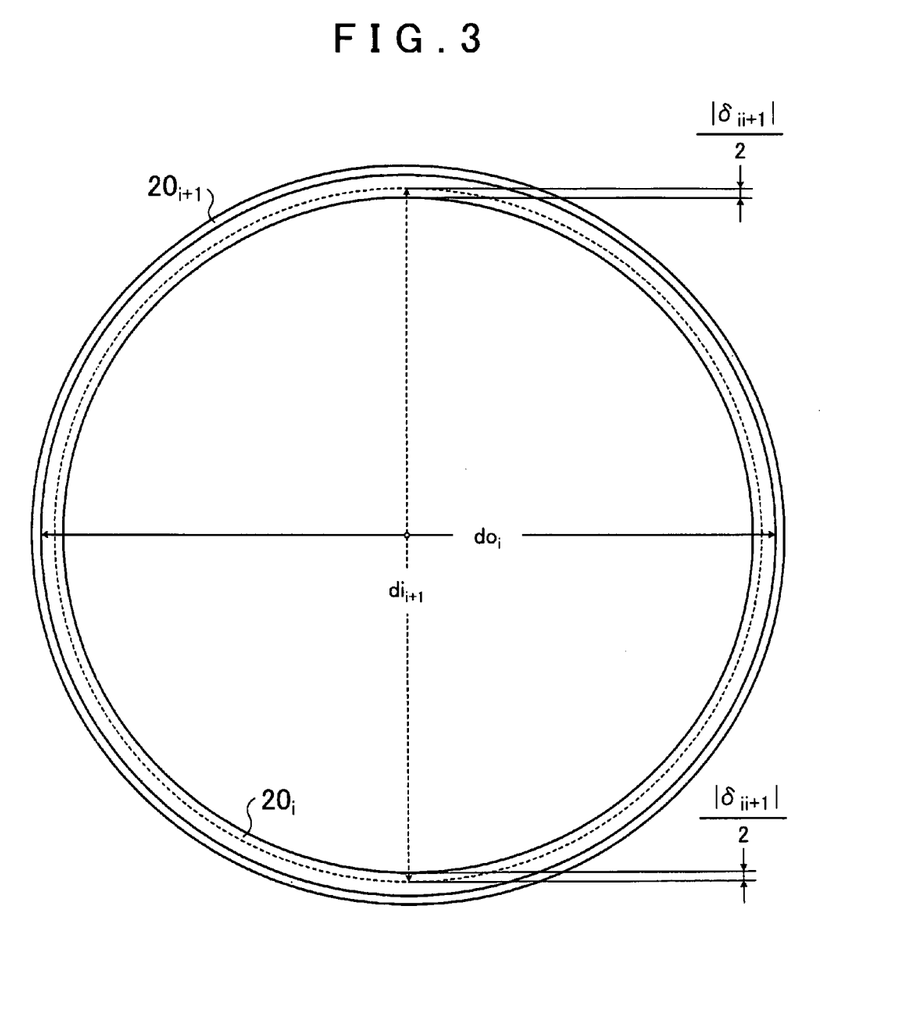
FIG. 3 is a schematic diagram showing a structure of a ring material $20_i$ on an inner layer side and a ring material $20_{i+1}$ on an outer layer side.

In the transmission belt 1, the outer circumferential length of a ring material (a press-fitting side or contracting side ring material) $20_i$ on an inner layer side, which is at least one of the plurality of ring materials $20_1$ to $20_6$ of the stacked ring 2 except for the ring material $20_6$ of the outermost layer, is longer than the inner circumferential length of a ring material (a press-fit side or expanding side ring material) $20_{i+1}$ on an outer layer side (where "i" is an integer satisfying $1 \leq i \leq n-1$, and "n" is the total number of ring materials (the number of stacked layers), which is a ring material having an inner peripheral surface 21 to be in contact with an outer peripheral surface 22 of the ring material $20_i$ on the inner layer side. That is, the ring material $20_i$ on the inner layer side and the ring material $20_{i+1}$ on the outer layer side are formed so that an outer diameter $do_i$ of the ring material $20_i$ on the inner layer side is somewhat larger than an inner diameter $di_{i+1}$ of the ring material $20_{i+1}$ on the outer layer side when both ring materials $20_i$, $20_{i+1}$ have a perfect circle shape as shown in FIG. 3. Thus, when the ring material $20_i$ on the inner layer side and the ring material $20_{i+1}$ on the outer layer side, which have an approximately perfect circle shape, are coaxially placed next to each other, their end faces 23 (see FIG. 2) contact each other, and the ring material $20_i$ on the inner layer side does not fit in the ring material $20_{i+1}$ on the outer layer side.

In the present embodiment, the value obtained by subtracting the outer diameter $do_i$ of the ring material $20_i$ on the inner layer side from the inner diameter $di_{i+1}$ of the ring material $20_{i+1}$ on the outer layer side is defined as an overlap interference (a press-fit interference) $\delta_{ii+1}$. In this case, if the overlap interference $\delta_{ii+1}$ is less than the value 0 ($\delta_{ii+1}<0$), the outer circumferential length of the ring material $20_i$ on the inner layer side is longer than the inner circumferential length of the ring material $20_{i+1}$ on the outer layer side. Thus, if the overlap interference $\delta_{ii+1}$ is less than the value 0, the ring material $20_i$ on the inner layer side is press-fit into the ring material $20_{i+1}$ on the outer layer side when forming the stacked ring 2, whereby a compressive stress is applied to the ring material $20_i$ on the inner layer side located on the inner layer side of the ring material $20_{i+1}$ on the outer layer side, when the stacked ring 2 (the transmission belt 1) is assembled. Thus, the strength of the ring material $20_i$ on the inner layer side can be increased, and durability of the stacked rings 2 and thus the transmission belt 1 can further be increased. Note that if the overlap interference $\delta_{ii+1}$ is larger than the value 0, the inner circumferential length of the ring material $20_{i+1}$ on the outer layer side is longer than the outer circumferential length of the ring material $20_i$ on the inner layer side, and clearance is formed between the outer peripheral surface 22 of the ring material $20_i$ on the inner layer side and the inner peripheral surface 21 of the ring material $20_{i+1}$ on the outer layer side.

If any ring material is present on the inner layer side of the ring material $20_i$ on the inner layer side that is press-fit into the ring material $20_{i+1}$ on the outer layer side, the ring material located on the inner layer side of the ring material $20_i$ on the inner layer side is also typically press-fit into the ring material (the ring material $20_i$, etc.) located on the outer layer side thereof, even if some clearance is present between the ring materials. Thus, of the ring materials $20_1$ to $20_6$ forming the stacked ring 2, if any one of the ring materials $20_2$ to $20_5$ other than the ring materials $20_1$ and $20_6$ of the innermost and outermost layers is press-fit into the ring material located on the outer layer side thereof, each ring material that is to be located on the inner layer side of the any one of the ring materials $20_2$ to $20_5$ is basically press-fit into the ring material located on the outer layer side thereof. Accordingly, a compressive stress is applied to the any one of the ring materials $20_2$ to $20_5$ and each ring material located on the inner layer side thereof, whereby the strength of each of the ring materials can be increased.

Figure 4:
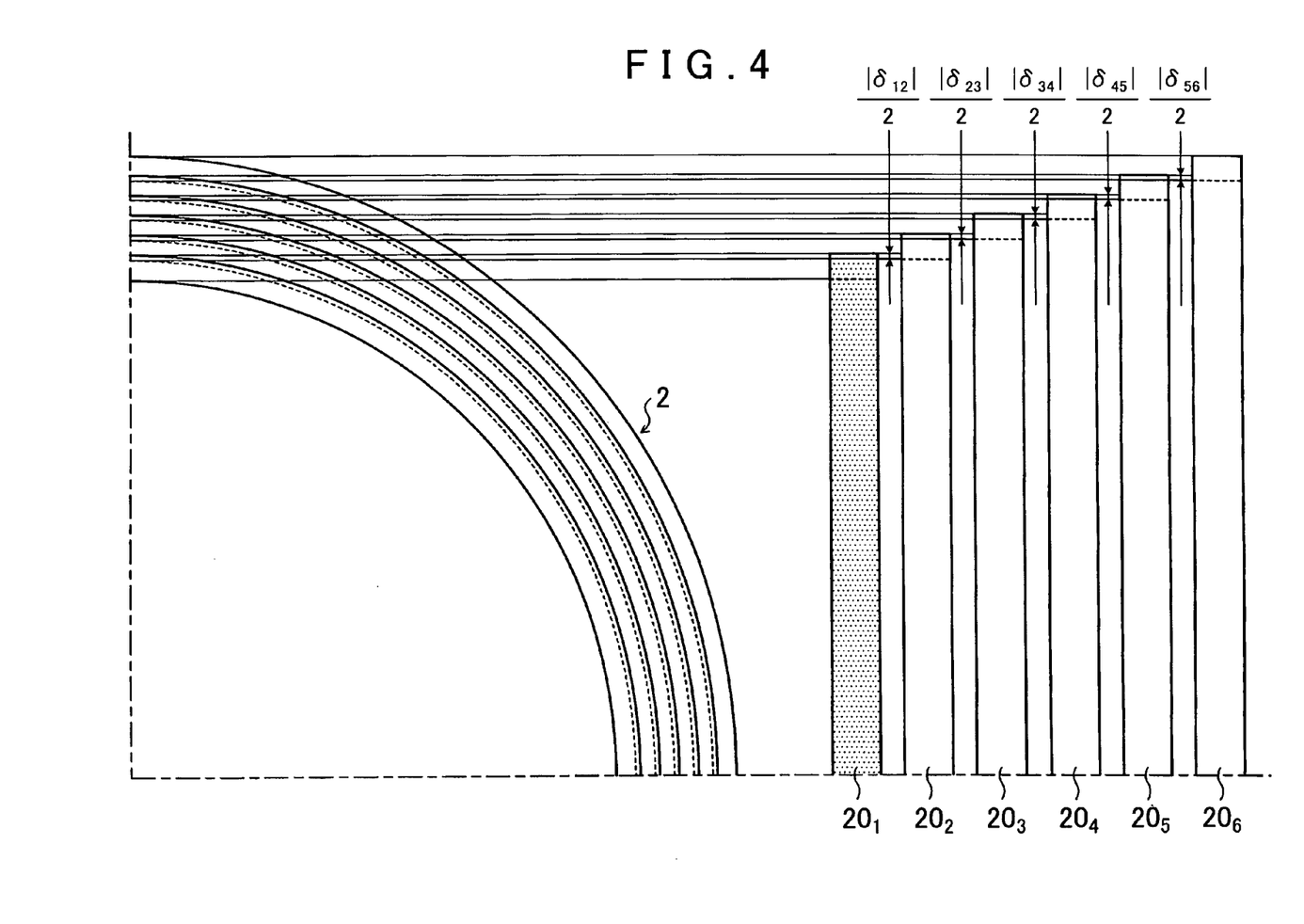
FIG. 4 is a schematic diagram showing, by way of example, a structure of the ring materials $20_1$ to $20_6$.

Of the ring materials $20_1$ to $20_6$, the ring material $20_1$ of the innermost layer is typically the weakest portion in the entire stacked ring 2. Accordingly, the ring material $20_1$ of the innermost layer and the ring material $20_2$ of the second innermost layer may be formed so that only the ring material $20_1$ of the innermost layer is press-fit into the ring material $20_2$ of the second innermost layer, and so that the outer circumferential length of the ring material $20_1$ is longer than the inner circumferential length of the ring material $20_2$, that is, so that the outer diameter ($do_1$) of the ring material $20_1$ is larger than the inner diameter ($di_2$) of the ring material $20_2$ by a value $|\delta_{12}|$ when both ring materials $20_1$, $20_2$ have a perfect circle shape, as shown in FIG. 4. Thus, when forming the stacked ring 2, the ring material $20_1$ of the innermost layer is press-fit into the ring material $20_2$ of the second innermost layer. Accordingly, when the stacked ring 2 (the transmission belt 1) is assembled, a compressive stress is applied to the ring material $20_1$, whereby the strength thereof can be increased.

Moreover, as shown in FIG. 4, all the ring materials $20_1$ to $20_5$ except for the ring material $20_6$ of the outermost layer may be used as the ring materials on the inner layer side described above, by making the outer diameter ($do_1$) of the ring material $20_1$ larger than the inner diameter ($di_2$) of the ring material $20_2$ by the value $|\delta_{12}|$, making the outer diameter ($do_2$) of the ring material $20_2$ larger than the inner diameter ($di_3$) of the ring material $20_3$ by a value $|\delta_{23}|$, making the outer diameter ($do_3$) of the ring material $20_3$ larger than the inner diameter ($di_4$) of the ring material $20_4$ by a value $|\delta_{34}|$, making the outer diameter ($do_4$) of the ring material $20_4$ larger than the inner diameter ($di_5$) of the ring material $20_5$ by a value $|\delta_{45}|$, and making the outer diameter ($do_5$) of the ring material $20_5$ larger than the inner diameter ($di_6$) of the ring material $20_6$ by a value $|\delta_{56}|$. In this case, in order to ensure the strength of the ring material $20_1$ of the innermost layer, which is typically the weakest portion in the entire stacked ring 2, the absolute value $|\delta_{12}|$ of the overlap interference $\delta_{12}$ between the ring material $20_1$ of the innermost layer and the ring material $20_2$ of the second innermost layer may be determined so as to be the largest among all the absolute values $|\delta_{ii+1}|$ of the overlap interferences $\delta_{ii+1}$ in the stacked ring 2. Moreover, when "n" is an integer equal to or larger than the value 4, "m" may be set to one of integers ranging from the value 2 to "n–2," and the overlap interference $\delta_{mm+1}$ between the ring material $20_m$ on the inner layer side and the ring material $20_{m+1}$ on the outer layer side may be set to the value 0 or more, so that clearance is formed therebetween. It should be understood that regarding the ring materials of the first to $j^{th}$ layers (where "j" is an integer satisfying $1 \le j \le n-2$), the ring materials of the first to $j^{th}$ layers may be used as the ring materials on the inner layer side described above by making the outer circumferential length of the ring material $20_j$ on the inner layer side longer than the inner circumferential length of the ring material $20_{j+1}$ on the outer layer side.

In the present embodiment, the layer positions of the ring materials that are used as the ring material $20_i$ on the inner layer side as described above (namely, that are press-fit into the ring material on the outer layer side) and the number of such ring materials, and the overlap interference $\delta_{ii+1}$ are basically determined so that the maximum value of a tensile stress that is generated in the plurality of ring materials $20_1$ to $20_6$ when the transmission belt 1 is used under predetermined conditions, that is, during power transmission (during operation of the continuously variable transmission) does not exceed a predetermined maximum allowable tensile stress σref. The absolute value of the overlap interference $\delta_{ii+1}$ as the difference between the inner diameter $di_{i+1}$ of the ring material $20_{i+1}$ on the outer layer side and the outer diameter $do_i$ of the ring material $20_i$ on the inner layer side is determined so as to be within such a range (e.g., 120 μm or less) that is larger than a value produced in a so-called tolerance range (an allowable range with respect to a reference value), and that the ring material $20_i$ on the inner layer side can be press-fit into the ring material $20_{i+1}$ on the outer layer side so that a contact state between the inner peripheral surface 21 of the ring material $20_{i+1}$ on the outer layer side and the outer peripheral surface 22 of the ring material $20_i$ on the inner layer side is satisfactorily maintained when tension is applied to the stacked ring 2.

However, if the overlap interference $\delta_{ii+1}$ (the difference between the outer circumferential length of the ring material $20_i$ of the $i^{th}$ layer and the inner circumferential length of the ring material $20_{i+1}$ of the $(i+1)^{th}$ layer) is increased excessively to the negative side, the ring material $20_i$ on the inner layer side is bent after the stacked ring 2 is formed, thereby reducing adhesion between the ring material $20_{i+1}$ on the outer layer side and the ring material $20_i$ on the inner layer side. This may result in troublesome assembling of the elements 3 to the stacked ring 2. Thus, it can be said that the amount by which the tensile stress that is generated in the plurality of ring materials $20_1$ to $20_6$ when the transmission belt 1 is used is decreased by increasing the overlap interference $\delta_{ii+1}$ to the negative side (by press-fitting of the ring material) has a limit value (e.g., about 100 MPa) in order to ensure assembling capability of the elements 3 to the stacked ring 2. Accordingly, the overlap interference $\delta_{ii+1}$ can be determined so that the amount by which the tensile stress that is generated in the plurality of ring materials $20_1$ to $20_6$ when the transmission belt 1 is used is decreased is equal to or lower than the limit value obtained by experiments and analysis. That is, the overlap interference $\delta_{ii+1}$ can be determined so that the outer peripheral surface of the ring material $20_i$ on the inner layer side having a longer outer circumferential length than the inner circumferential length of the ring material $20_{i+1}$ on the outer layer side is held in contact with the inner peripheral surface of the ring material $20_{i+1}$ on the outer layer side along the entire circumference when the stacked ring 2 is formed. Thus, of the plurality of ring materials $20_1$ to $20_6$, the outer peripheral surface of the ring material $20_i$ having a longer outer circumferential length than the inner circumferential length of the ring material $20_{i+1}$ located immediately outside the ring material $20_i$ can be made to contact the inner peripheral surface of this ring material $20_{i+1}$ along the entire circumference, whereby assembling capability of the elements 3 to the stacked ring 2 can be satisfactorily maintained. From this standpoint, the term "press-fit" as used in the present invention means that an inner ring material, which has a longer outer circumferential length than the inner circumferential length of a ring material located immediately outside the inner ring material, is fit into the ring material located immediately outside the inner ring material, whereby the inner ring material is contracted inward in a radial direction, and the ring material located immediately outside the inner ring material is expanded outward in the radial direction, so that the outer peripheral surface of the inner ring material contacts, along the entire circumference, the inner peripheral surface of the ring material located immediately outside the inner ring material.

Moreover, in the present embodiment, of the plurality of ring materials $20_1$ to $20_6$ forming the stacked ring 2, at least the ring material $20_1$ of the innermost layer, which tends to be the weakest portion, is subjected to shot peening as a surface treatment for applying a residual compressive stress to a surface layer portion (see a shaded portion in FIG. 4). By this treatment, the surface layer portion is hardened, and the residual compressive stress is applied, whereby the strength of at least the ring material $20_1$ of the innermost layer can be satisfactorily increased. The shot peening is a surface treatment technique similar to so-called shot blasting, and is a technique of bombarding mainly the inner peripheral surface 21 and the outer peripheral surface 22 of the target ring material with, e.g., steel balls having a small diameter (e.g., about 0.01 mm to 0.5 mm) at a high speed by an air pressure or a mechanical force. It should be understood that such a surface treatment may be performed on all of the plurality of ring materials $20_1$ to $20_6$, and the plurality of ring materials $20_1$ to $20_6$ may include both the ring material or materials that have been subjected to such a surface treatment, and the ring material or materials that have not been subjected to such a surface treatment. Note that the surface treatment that is performed on at least one of the ring materials $20_1$ to $20_6$ may be any treatment other than the shot peening as long as the residual compressive stress can be applied to the surface layer portion of the ring material. A nitriding treatment may additionally be performed on the surface of at least one or all of the ring materials $20_1$ to $20_6$. This can further increase the residual compressive stress (the strength) of at least one or all of the ring materials $20_1$ to $20_6$.

Thus, if the residual compressive stress is applied to the ring material $20_1$ of the innermost layer (a first layer) by the shot peening, the residual compressive stress of the ring material $20_1$ of the innermost layer (the first layer) is higher than that of at least the ring material $20_2$ of the second innermost layer (a second layer), and the ring material $20_1$ of the innermost layer has higher strength (yield strength) than that of at least the ring material $20_2$ of the second layer. If the outer circumferential length of the ring material $20_1$ of the innermost layer is made longer than the inner circumferential length of the ring material $20_2$ of the second layer so that the ring material $20_1$ of the innermost layer is press-fit into the ring material $20_2$ of the second layer, a compressive stress is further applied to the ring material $20_1$ of the innermost layer located on the inner layer side of the ring material $20_2$ of the second layer, when the transmission belt 1 is assembled. As a result, the strength of the ring material $20_1$ of the innermost layer located on the inner layer side of the ring material $20_2$ of the second layer can be satisfactorily increased, whereby durability of the transmission belt 1 can further be increased. If the outer circumferential length of the ring material $20_2$ of the second layer is made longer than the inner circumferential length of the ring material $20_3$ of the third innermost layer (a third layer) so that the ring material $20_2$ of the second layer is press-fit into the ring material $20_3$ of the third layer, a compressive stress is further applied to the ring material $20_1$ of the innermost layer and the ring material $20_2$ of the second layer. This can more satisfactorily increase the strength of the ring material $20_1$ of the innermost layer and the ring material $20_2$ of the second layer, which are located on the inner layer side of the ring material $20_3$ of the third layer, whereby durability of the transmission belt 1 can further be increased.

That is, by performing the shot peening on the surfaces of the ring materials $20_1, \ldots, 20_m$ of the first layer as the innermost layer to a predetermined $m^{th}$ layer (where "m" is any one of integers ranging from the value 1 to the value "n−1") so that the residual compressive stress of the ring materials $20_1, \ldots, 20_m$ is higher than that of the ring materials $20_{m+1}, \ldots, 20_n$ of the $(m+1)^{th}$ to $n^{th}$ layers, the strength (yield strength) of the ring materials $20_1, \ldots, 20_m$ of the first to $m^{th}$ layers can be made higher than that of the ring materials $20_{m+1}, \ldots, 20_n$ of the $(m+1)^{th}$ to $n^{th}$ layers. Moreover, if "k" is an integer ranging from the value 1 to the value "m," and the outer circumferential length of the ring material $20_k$ of the $k^{th}$ layer is made longer than the inner circumferential length of the ring material $20_{k+1}$ of the $(k+1)^{th}$ layer, the ring material $20_k$ of the $k^{th}$ layer is press-fit into the ring material $20_{k+1}$ of the $(k+1)^{th}$ layer located on the outer circumference side of the ring material $20_k$ (that is, located immediately outside the ring material $20_k$). Thus, when the transmission belt 1 is assembled, a compressive stress is further applied to the ring materials $20_1, \ldots, 20_m$ of the first to $m^{th}$ layers, whereby the strength of the ring materials $20_1, \ldots, 20_m$ of the first to $m^{th}$ layers can further be increased. Accordingly, if the inner layer side of a pair of ring materials disposed on the outermost layer, among pairs of adjacent rings whose overlap interference $\delta_{ii+1}$ exceeds the above limit value, is defined as the $m^{th}$ layer, the ring materials $20_1, \ldots, 20_n$ may be assembled together by performing the shot peening on the ring materials $20_1, \ldots, 20_m$ of the first to $m^{th}$ layers, and setting each overlap interference between the layers so that the stress in the ring materials $20_1, \ldots, 20_n$ of the innermost (first) to outermost ($n^{th}$) layers is substantially constant, in consideration of the amount by which the stress is decreased by the shot peening. This can suppress an increase in cost associated with the shot peening, as compared to the case where the shot peening is performed on the ring materials $20_1, \ldots, 20_n$ of all the layers, and can also improve the assembling capability of the elements 3 to the stacked ring 2 as compared to the case where the ring material on the inner layer side is press-fit into the ring material on the outer layer side between every pair of adjacent layers so that the stress in the ring materials of all the layers is substantially constant. Note that the amount by which the tensile stress is decreased by the shot peening also has a limit value (e.g., about 100 MPa), and the stress that is generated in the $m^{th}$ layer having the press-fit interference exceeding its limit value when the belt is used cannot be decreased to zero by merely performing the shot peening. Thus, the shot peening is performed on the ring materials of the innermost to $m^{th}$ layers, and press-fitting of the ring materials is performed between the respective pairs of the innermost to $(m+1)^{th}$ layer. Performing the shot peening on the surfaces of the ring materials $20_1, \ldots, 20_m$ of the first to $m^{th}$ layers can suppress an increase in compressive stress that should be applied to the ring materials $20_1, \ldots, 20_m$ of the first to $m^{th}$ layers by press-fitting each of the ring materials $20_1, \ldots, 20_m$ of the first to $m^{th}$ layers into the ring material $20_2, \ldots, 20_{m+1}$ located on the outer layer side thereof, namely an increase in difference between the outer circumferential length of the ring material $20_k$ on the inner layer side and the inner circumferential length of the ring material $20_{k+1}$ on the outer layer side (an increase in overlap interference $\delta_{kk+1}$ to the negative side). Thus, adhesion can be satisfactorily ensured between adjacent ones of the ring materials located on the inner side of the $(m+1)^{th}$ layer. As a result, in the transmission belt 1, an increase in cost is suppressed by reducing the number of ring materials to be subjected to the shot peening, and the assembling capability of the elements 3 to the stacked ring 2 is satisfactorily maintained by satisfactorily ensuring adhesion between the ring materials. At the same time, the tensile stress that is generated in the ring materials $20_1, \ldots, 20_n$ when the transmission belt 1 is used can be reduced.

Figure 5:
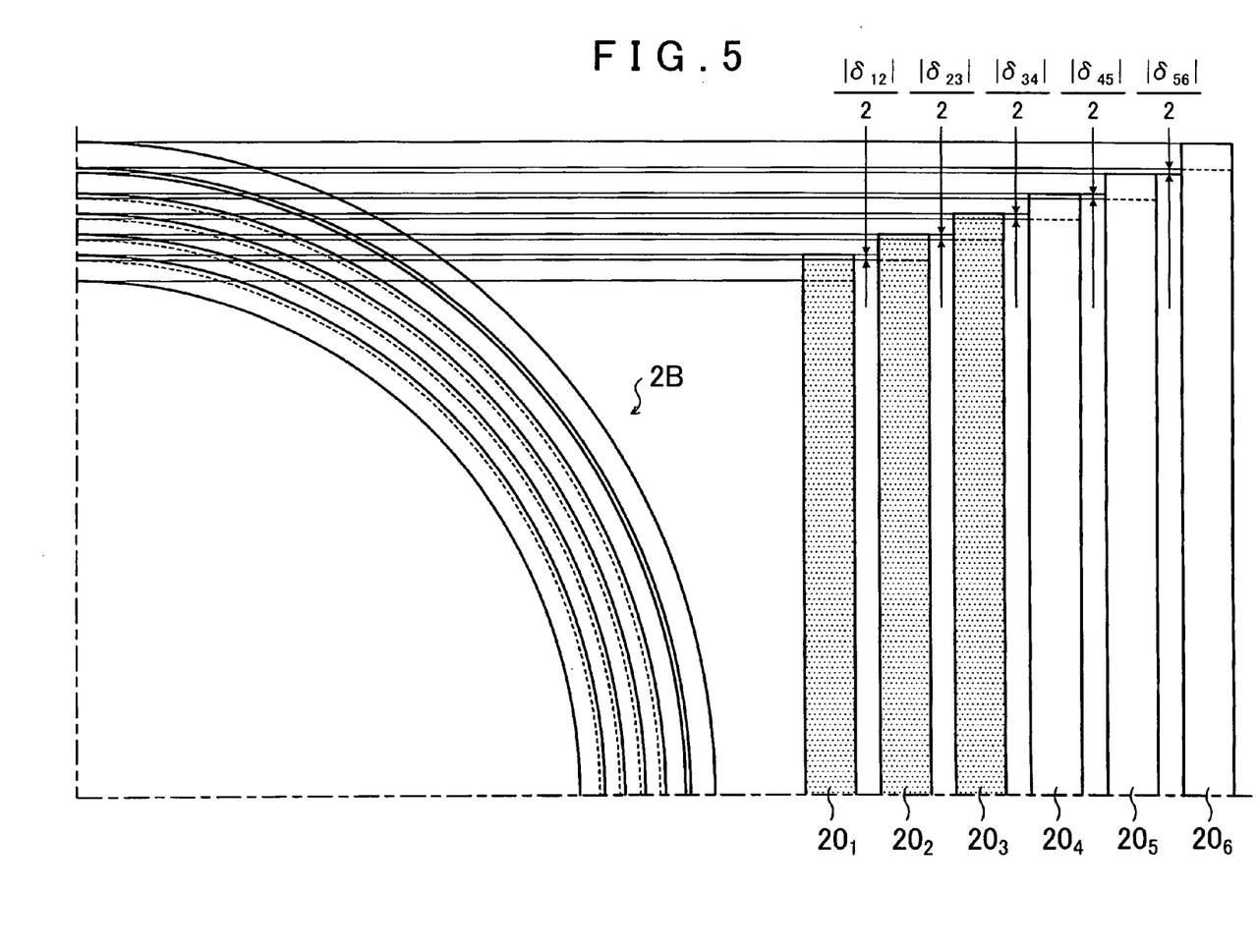
FIG. 5 is a schematic diagram showing, by way of example, another structure of the ring materials $20_1$ to $20_6$.

FIG. 5 shows a stacked ring 2B in which the number of stacked ring materials "n"=6, and "m"=3. This stacked ring 2B is structured by applying a residual compressive stress to the ring materials $20_1, 20_2, 20_3$ of the first to third layers (the $m^{th}$ layer) by the shot peening (see shaded portions in FIG. 5), and by press-fitting the ring material $20_1$ of the first layer into the ring material $20_2$ of the second layer, press-fitting the ring material $20_2$ of the second layer into the ring material $20_3$ of the third layer (the $m^{th}$ layer), and press-fitting the ring material $20_3$ of the third layer into the ring material $20_4$ of the fourth layer (the $(m+1)^{th}$ layer), and further press-fitting the ring material $20_4$ of the fourth layer (the $(m+1)^{th}$ layer) into the ring material $20_5$ of the fifth layer (the $(m+2)^{th}$ layer).

As in the example of FIG. 5, when "n" is an integer of the value 3 or more, and "m" is any one of integers ranging from the value 1 to the value "n−2," the compressive stress can further be applied to the ring material $20_{m+1}$ of the $(m+1)^{th}$ layer when the transmission belt 1 is assembled, by making the outer circumferential length of the ring material $20_{m+1}$ of the $(m+1)^{th}$ layer longer than the inner circumferential length of the ring material $20_{m+2}$ of the $(m+2)^{th}$ layer. In this manner, relatively low-cost processing is performed in which the outer circumferential lengths of those ring materials $20_m, 20_{m+1}$ which are located on the outer layer side (the $m^{th}$ and $(m+1)^{th}$ layers) where the tensile stress generated in the ring materials when the transmission belt 1 is used is relatively low are made longer than the inner circumferential lengths of those ring materials $20_{m+1}, 20_{m+2}$ which are located immediately outside the ring materials $20_m, 20_{m+1}$. Moreover, the shot peening is performed on those ring materials $20_1, \ldots, 20_m$ which are located on the inner layer side (the first to $m^{th}$ layers) where the tensile stress generated in the ring materials when the transmission belt is used is relatively high. Thus, an increase in cost is suppressed by reducing the number of ring materials to be subjected to the shot peening, and the assembling capability of the elements 3 to the stacked ring 2 is satisfactorily maintained by satisfactorily ensuring adhesion between the ring materials. At the same time, the tensile stress that is generated in the ring materials $20_1, \ldots, 20_n$ when the transmission belt 1 is used can be satisfactorily reduced.

Note that in the example of FIG. 5, the overlap interference $\delta_{56}$ between the ring material $20_5$ of the fifth layer and the ring material $20_6$ of the sixth layer has a positive value, and thus the ring material $20_5$ of the fifth layer is not press-fit into the ring material $20_6$ of the sixth layer. However, the overlap interference $\delta_{56}$ between the ring material $20_5$ of the fifth layer and the ring material $20_6$ of the sixth layer may have a negative value so that the ring material $20_5$ of the fifth layer is press-fit into the ring material $20_6$ of the sixth layer. Alternatively, the overlap interferences $\delta_{45}$ and $\delta_{56}$ may have a positive value so that the ring material $20_4$ of the fourth layer (the $(m+1)^{th}$ layer) is not press-fit into the ring material $20_5$ of the fifth layer (the $(m+2)^{th}$ layer), and the ring material $20_5$ of the fifth layer is not press-fit into the ring material $20_6$ of the sixth layer. Alternatively, the overlap interference $\delta_{45}$ may have a positive value and the overlap interference $\delta_{56}$ may have a negative value so that the ring material $20_4$ of the fourth layer (the $(m+1)^{th}$ layer) is not press-fit into the ring material $20_5$ of the fifth layer (the $(m+2)^{th}$ layer), and the ring material $20_5$ of the fifth layer is press-fit into the ring material $20_6$ of the sixth layer. It should be understood that the number n of stacked ring materials, and the number m of ring materials to which the residual compressive stress is to be applied may be determined arbitrarily.

Procedures of setting the above overlap interference $\delta_{ii+1}$ will be described below with reference to FIGS. 6, 7, etc.

Figure 6:
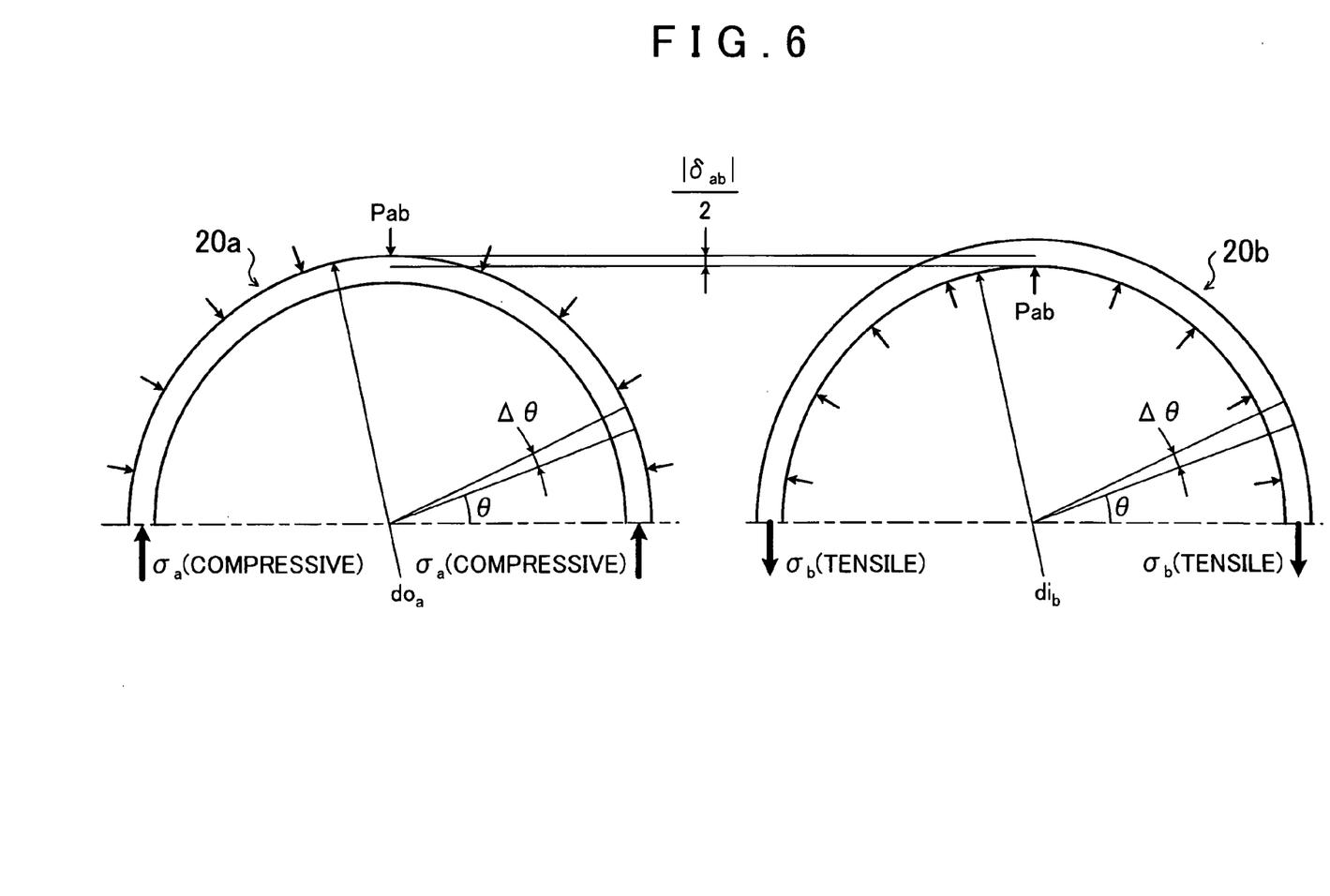
FIG. 6 is a schematic diagram illustrating procedures of setting an overlap interference $\delta_{ii+1}$.
Figure 7:
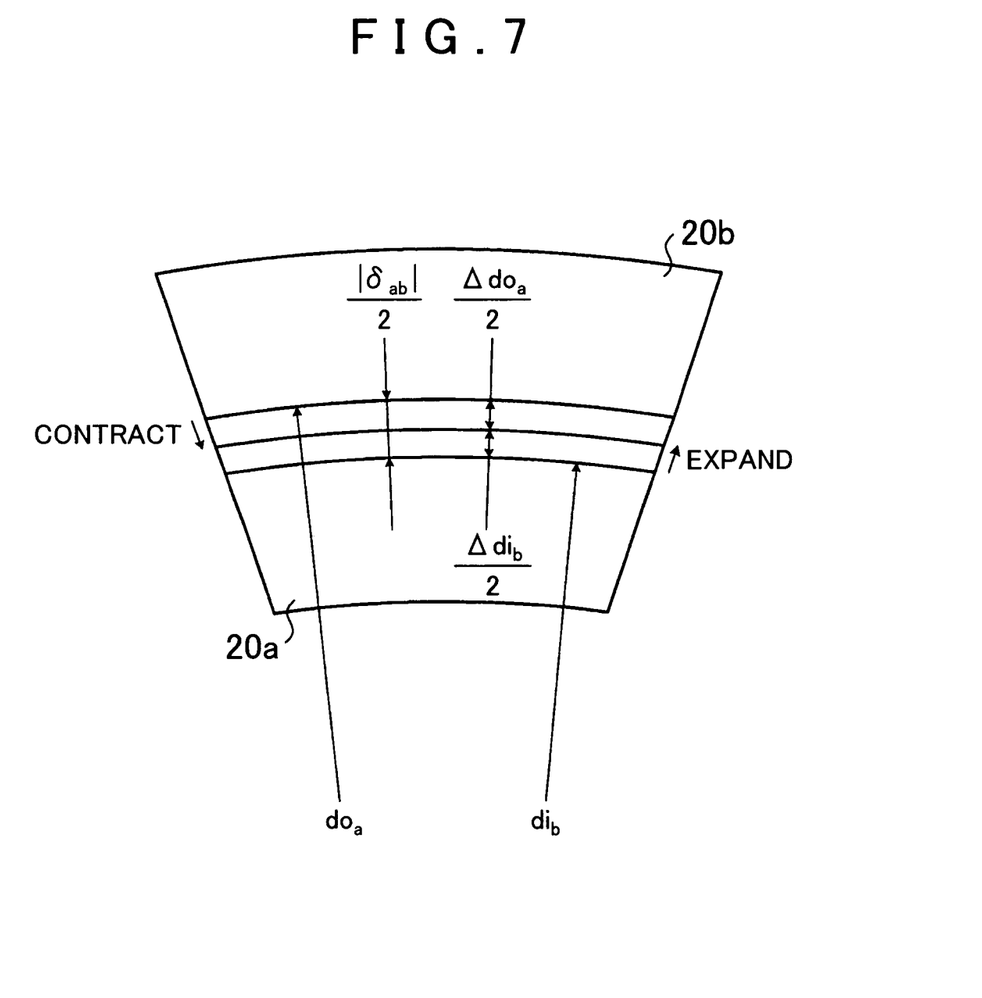
FIG. 7 is a schematic diagram illustrating procedures of setting the overlap interference $\delta_{ii+1}$.

As shown in FIG. 6, a certain ring material $20a$ on the inner layer side is press-fit into a ring material $20b$ on the outer layer side. The outer diameter of the ring material $20a$ is represented by "$do_a$ (mm)," the thickness is represented by "$t_a$ (mm)," the Young's modulus is represented by "$E_a$ (MPa)," the overlap interference between the ring materials $20a$ and $20b$ is represented by "$\delta_{ab}$," the inner diameter of the ring material $20b$ is represented by "$di_b=do_a-\delta_{ab}$ (mm)," the thickness is represented by "$t_b$ (mm)," and the Young's modulus is represented by "$E_b$ (MPa)." It is assumed that as shown in FIG. 7, the ring material $20a$ on the inner layer side has been contracted by a value $\Delta do_a$, and the ring material $20b$ on the outer layer side has been expanded by a value $\Delta di_b$ by press-fitting the ring material $20a$ on the inner layer side into the ring material $20b$ on the outer layer side. Moreover, if $do_a=di_b$ and $E_a=E_b=E$ in view of the fact that both the ring materials $20a$ and $20b$ are thin members, a compressive stress $\sigma_a$ applied to the ring material $20a$ on the inner layer side, and a tensile stress $\sigma_b$ applied to the ring material $20b$ on the outer layer side can be represented by the following expression (1).

[Expression 1]

$$\left. \begin{array}{l} \sigma_a = -\dfrac{\delta_{ab} \cdot E \cdot t_b}{do_a(t_a+t_b)} \\ \sigma_b = \dfrac{\delta_{ab} \cdot E \cdot t_a}{do_a(t_a+t_b)} \end{array} \right\} \Lambda \quad (1)$$

If the stacked ring 2 is formed by stacking "n" ring materials $20_1, 20_2, \ldots, 20_i, \ldots 20_n$ together (where "i" is an integer ranging from the value 1 to the value (n−1), the ring material $20_1$ is the ring material of the innermost layer, and the ring material $20_n$ is the ring material of the outermost layer), the overlap interference between the ring materials $20_i$ and $20_{i+1}$ is sequentially represented by "$\delta_{12}, \delta_{23}, \ldots, \delta_{ii+1}, \ldots, \delta_{n-1n}$" from the inner layer side, the outer diameter of the ring material $20_i$ is sequentially represented by "$do_1, do_2, \ldots, do_i, \ldots, do_n$" from the inner layer side, and the thickness of each layer of the ring material is represented by "t," a compressive stress $\sigma a_{ii+1}$ generated on the inner side of the overlap interference $\delta_{ii+1}$ and a tensile stress $\sigma b_{ii+1}$ generated on the outer side of the overlap interference $\delta_{ii+1}$ due to the presence of the overlap interference $\delta b_{ii+1}$ between the ring materials $20_i$ and $20_{i+1}$ can be represented by the following expression (2).

[Expression 2]

$$\left.\begin{array}{l}\sigma_{aii+1} = -\dfrac{\delta_{ii+1} \cdot E \cdot (n-i) \cdot t}{do_i(i \cdot t + (n-i) \cdot t)} = -\dfrac{(n-i)}{n} \cdot \dfrac{\delta_{ii+1} \cdot E}{d_i} \\[2mm] \sigma_{bii+1} = \dfrac{\delta_{ii+1} \cdot E \cdot i \cdot t}{do_i(i \cdot t + (n-i) \cdot t)} = \dfrac{i}{n} \cdot \dfrac{\delta_{ii+1} \cdot E}{d_i}\end{array}\right\} \Lambda \quad (2)$$

Moreover, the stress that is applied to each of the ring materials $20_1, 20_2, \ldots, 20_n$, when each of the ring materials $20_1, 20_2, \ldots, 20_n$ is press-fit into the ring material $20_2, 20_3, \ldots, 20_{n-1}$ located on the outer layer side thereof can be represented by the following expression (3) as the sum of the compressive stress $\sigma a_{ii+1}$ and the tensile stress $\sigma b_{ii+1}$ in the above expression (2). By using the expressions (2) and (3), the overlap interferences $\delta_{12}, \delta_{23}, \ldots, \delta_{n-1n}$ can be set so that the maximum value of the tensile stress generated in the plurality of ring materials $20_1$ to $20_n$ during power transmission of the transmission belt 1 (during operation of the continuously variable transmission) under predetermined conditions does not exceed the predetermined maximum allowable tensile stress $\sigma$ref.

[Expression 3]

$$\left.\begin{array}{l}\sigma_1 = \sigma_{a12} + \sigma_{a23} + \sigma_{a34} + \sigma_{a45} + \Lambda + \sigma_{an-1n} \\ \sigma_2 = \sigma_{b12} + \sigma_{a23} + \sigma_{a34} + \sigma_{a45} + \Lambda + \sigma_{an-1n} \\ \sigma_3 = \sigma_{b12} + \sigma_{b23} + \sigma_{a34} + \sigma_{a45} + \Lambda + \sigma_{an-1n} \\ M \\ \sigma_n = \sigma_{b12} + \sigma_{b23} + \sigma_{b34} + \sigma_{b45} + \Lambda + \sigma_{bn-1n}\end{array}\right\} \Lambda \quad (3)$$

In the present embodiment, before setting the overlap interference $\delta_{ii+1}$ by using the expressions (2) and (3), the maximum tensile stress applied to each ring material of an existing stacked ring under predetermined test conditions (e.g., when a continuously variable transmission is operated at the maximum speed ratio or the minimum speed ratio with input torque Tin and an input shaft rotational speed Nin being predetermined values) is obtained by three-dimensional finite element analysis or actual measurement, and the differences in stress between adjacent ones of the ring materials are obtained from the obtained maximum tensile stress of each ring material. The base values of the overlap interferences $\delta_{12}, \delta_{23}, \ldots, \delta_{n-1n}$ are determined based on the obtained differences in stress between the ring materials. Then, by using the expressions (2) and (3) while adjusting the base values, optimal overlap interferences $\delta_{12}, \delta_{23}, \ldots, \delta_{n-1n}$ are set so that the maximum value of the tensile stress that is generated in the plurality of ring materials $20_1$ to $20_n$ under the test conditions does not exceed the maximum allowable tensile stress $\sigma$ref.

For example, in an existing stacked ring $2x$ formed by stacking together six ring materials $20_1$ to $20_6$ (thickness: e.g., about 180 to 190 μm, and inner diameter: e.g., about 190 to 200 mm), in which all the overlap interferences $\delta_{12}, \delta_{23}, \delta_{34}, \delta_{45},$ and $\delta_{56}$ between adjacent ones of the ring materials are "$0\pm\alpha$" (μm) (where "$\alpha$" represents a value that defines the tolerance range, and is, e.g., about 10 (μm); the same applies to the following description), if the continuously variable transmission is operated at the maximum speed ratio with the input torque Tin being a predetermined value T1 and the input shaft rotational speed Nin being a predetermined value N1, the tensile stress that is applied to the ring material $20_1$ of the innermost layer has the maximum value among the ring materials $20_1$ to $20_6$. The differences in stress between the ring materials of such a stacked ring $2x$ are obtained by the three-dimensional finite element analysis or actual measurement. Then, by using the expressions (2) and (3), the overlap interferences $\delta_{12}, \delta_{23}, \delta_{34}, \delta_{45},$ and $\delta_{56}$, for example, are set to $\delta_{12}=-40\pm\alpha$ (μm), $\delta_{23}=-40\pm\alpha$ (μm), $\delta_{34}=-40\pm\alpha$ (μm), $\delta_{45}=-40\pm\alpha$ (μm), and $\delta_{56}=-40\pm\alpha$ (μm). In this manner, the maximum tensile stress that is applied to the ring material $20_1$ of the innermost layer under these test conditions can be reduced by approximately 100 MPa to a value within the range of the maximum allowable tensile stress $\sigma$ref, without performing the shot peening on any of the ring materials $20_1$ to $20_6$.

In the above stacked ring $2x$, the tensile stress that is applied to the ring material $20_1$ of the innermost layer is the largest among the ring materials $20_1$ to $20_6$, even when the continuously variable transmission is operated with the input torque Tin being a predetermined value T2 (e.g., T2>t1). Under such test conditions, the shot peening is performed only on the ring material $20_1$ of the innermost layer, and the overlap interferences $\delta_{12}, \delta_{23}, \delta_{34}, \delta_{45},$ and $\delta_{56}$ are set to $\delta_{12}=-30\pm\alpha$ (μm), $\delta_{23}=-30\pm\alpha$ (μm), $\delta_{34}=-30\pm\alpha$ (μm), $\delta_{45}=30\pm\alpha$ (μm), and $\delta_{56}=-30\pm\alpha$ (μm) by using the differences in stress between the ring materials of the stacked ring $2x$ and the expressions (2) and (3). Thus, the maximum tensile stress that is applied to the ring material $20_1$ of the innermost layer can be reduced by approximately 150 to 200 MPa to a value within the range of the maximum allowable tensile stress $\sigma$ref. In the case where the tensile stress that is generated in the ring materials when the transmission belt 1 is used increases from the outer layer side toward the inner layer side, the overlap interferences $\delta_{12}, \delta_{23}, \delta_{34}, \delta_{45},$ and $\delta_{56}$, for example, may be set to $\delta_{12}=-40\pm\alpha$ (μm), $\delta_{23}=30\pm\alpha$ (μm), $\delta_{34}=20\pm\alpha$ (μm), $\delta_{45}=-10\pm\alpha$ (μm), and $\delta_{56}=0\pm\alpha$ (μm) such that the overlap interference increases to the negative side from the outer layer side toward the inner layer side. This makes it possible to make the stress generated in the ring materials of all the layers when the belt is used to be approximately constant in consideration of the amount by which the stress is decreased by the shot peening performed on the ring materials of the innermost layer to the $m^{th}$ layer. Note that although the number of shots in the shot peening may be set arbitrarily, the number of shots is preferably set so as to maximize the amount by which the tensile stress is decreased by the shot peening. Thus, the maximum tensile stress that is applied to the ring materials of the innermost layer to the $m^{th}$ layer can be reduced to a value within the range of the maximum allowable tensile stress $\sigma$ref, and the tensile stress that is generated in the ring materials $20_1$ to $20_6$ when the transmission belt 1 is used can be made approximately constant.

As described above, the stacked ring 2 of the transmission belt 1 of the present invention is formed by stacking the plurality of elastically deformable ring materials $20_1$ to $20_6$ together, and the outer circumferential length of the ring material $20_i$ on the inner layer side, which is at least one of the plurality of ring materials $20_1$ to $20_6$ other than the ring material $20_6$ of the outermost layer, is longer than the inner circumferential length of the ring material $20_{i+1}$ on the outer layer side, which is a ring material having the inner peripheral surface 21 to be in contact with the outer peripheral surface 22 of the ring material $20_i$ on the inner layer side. Thus, when forming the stacked ring 2, the ring material $20_i$ on the inner layer side is press-fit into the ring material $20_{i+1}$ on the outer layer side, and if any ring material is present on the inner layer side of the ring material $20_i$ on the inner layer side, this ring material located on the inner layer side of the ring material $20_i$ on the inner layer side is typically also press-fit with respect to the ring material located on the outer layer side thereof. Thus, when the transmission belt 1 is assembled, a compressive stress is applied to the ring material or materials located on the inner layer side of the ring material $20_{i+1}$ on the outer layer side. As a result, the strength of the ring material or materials located on the inner layer side of the ring material $20_{i+1}$ on the outer layer side can be increased, whereby durability of the transmission belt 1 can further be increased.

By making the outer diameter $do_i$ of the ring material $20_i$ on the inner layer side larger than the inner diameter $di_{i+1}$ of the ring material $20_{i+1}$ on the outer layer side when the ring material $20_i$ on the inner layer side and the ring material $20_{i+1}$ on the outer layer side have a perfect circle shape, the outer circumferential length of the ring material $20_i$ on the inner layer side can be made longer than the inner circumferential length of the ring material $20_{i+1}$ on the outer layer side. Moreover, in the transmission belt 1, by making the outer circumferential length of the ring material $20_1$ of the innermost layer out of the plurality of ring materials $20_1$ to $20_6$ longer than the inner circumferential length of the ring material $20_2$ of the second innermost layer, the strength of the ring material $20_1$ of the innermost layer, which is typically the weakest portion in the stacked ring 2, can be satisfactorily ensured. If a surface treatment for applying a residual compressive stress to a surface layer portion is performed on at least one of the plurality of ring materials $20_1$ to $20_6$, the strength of this ring material can be more satisfactorily increased.

Although the embodiment of the present invention are described above, the present invention is not limited to the above embodiment, and various modifications can be made without departing from the subject matter of the present invention. Moreover, the description in "DETAILED DESCRIPTION OF THE EMBODIMENT" merely provides specific examples of the invention described in "SUMMARY OF THE INVENTION," and the invention described in "SUMMARY OF THE INVENTION" should be construed based on the description therein.

The present invention can be used in the manufacturing industry of transmission belts.

The invention claimed is:

1. A transmission belt, comprising:
   a stacked ring formed by stacking a plurality of elastically deformable ring materials together; and
   a plurality of elements arranged in a ring shape and linked together by the stacked ring, wherein
   when "n" represents the number of ring materials that are stacked together, surfaces of the ring materials of a first layer as an innermost layer to a predetermined $m^{th}$ layer, where "m" is any one of integers ranging from a value 1 to a value n−1, are subjected to a surface treatment for applying a residual compressive stress so that the residual compressive stress in the ring materials of the first layer to the predetermined $m^{th}$ layer is higher than that in the ring material of an $(m+1)^{th}$ layer, and each of the ring materials of the first layer to the $m^{th}$ layer is formed so as to have an outer circumferential length longer than an inner circumferential length of a ring material that is located adjacent and outward of the corresponding each of the ring materials, such that an inner peripheral surface of the ring material that is located adjacent and outward of the corresponding each of the ring materials is in contact with an outer peripheral surface of the each of the ring materials.

2. The transmission belt according to claim 1, wherein each of the ring materials of the first layer to the $m^{th}$ layer is in contact with the inner peripheral surface of the ring material that is located adjacent and outward of the corresponding each of the ring materials along an entire circumference.

3. The transmission belt according to claim 1, wherein when the ring material of a $k^{th}$ layer and the ring material of a $(k+1)^{th}$ layer have a perfect circle shape, where "k" is an integer ranging from the value 1 to the value m, an outer diameter of the ring material of the $k^{th}$ layer is larger than an inner diameter of the ring material of the $(k+1)^{th}$ layer.

4. The transmission belt according to claim 3, wherein a difference between the outer diameter of the ring material of the $k^{th}$ layer and the inner diameter of the ring material of the $(k+1)^{th}$ layer is determined so that a maximum value of a tensile stress that is generated in the plurality of ring materials during power transmission of the transmission belt under a predetermined condition does not exceed a predetermined maximum allowable tensile stress.

5. The transmission belt according to claim 3, wherein when an overlap interference is a value that is obtained by subtracting the outer diameter of the ring material of the $k^{th}$ layer from the inner diameter of the ring material of the $(k+1)^{th}$ layer, an absolute value of the overlap interference between the ring material of the innermost layer and the ring material of a second innermost layer is determined so as to be largest among all of absolute values of the overlap interferences in the stacked ring.

6. The transmission belt according to claim 3, wherein when the overlap interference is the value that is obtained by subtracting the outer diameter of the ring material of the $k^{th}$ layer from the inner diameter of the ring material of the $(k+1)^{th}$ layer, the value m is determined based on a limit value of an amount by which the tensile stress that is generated in the ring material of the $k^{th}$ layer is decreased by setting the overlap interference to a negative value.

7. The transmission belt according to claim 1, wherein when "n" is an integer of a value 3 or more, and "m" is any one of integers ranging from the value 1 to a value "n−2," an outer circumferential length of the ring material of the $(m+1)^{th}$ layer is longer than the inner circumferential length of the ring material of an $(m+2)^{th}$ layer.

8. A method for manufacturing a transmission belt including a stacked ring formed by stacking a plurality of elastically deformable ring materials together, and a plurality of elements arranged in a ring shape and linked together by the stacked ring, the method comprising:
   forming, when "n" represents the number of ring materials that are stacked together, each of the ring materials of a first layer as an innermost layer to a predetermined $m^{th}$ layer, where "m" is any one of integers ranging from a value 1 value n−1, so that the each of the ring materials has an outer circumferential length longer than an inner circumferential length of a ring material that is located adjacent and outward of the corresponding each of the ring materials, such that an inner peripheral surface of the ring material that is located adjacent and outward of the corresponding each of the ring materials is in contact with an outer peripheral surface of the each of the ring materials; and subjecting surfaces of the ring materials of the first layer to the $m^{th}$ layer to a surface treatment for applying a residual compressive stress so that the residual compressive stress in the ring materials of the first layer to the $m^{th}$ layer is higher than that in the ring material of an $(m+1)^{th}$ layer.

* * * * *